United States Patent [19]
Davis

[11] Patent Number: 5,970,968
[45] Date of Patent: *Oct. 26, 1999

[54] CONTROL OF A MULTI (FLEXIBLE) FUELED VEHICLE UTILIZING WIDE RANGE OXYGEN SENSOR FEEDBACK

[75] Inventor: Stuart M. Davis, Bloomfield Hills, Mich.

[73] Assignee: Chrysler Corporation, Auburn Hills, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/937,913

[22] Filed: Sep. 25, 1997

[51] Int. Cl.$^6$ .................................................. F02M 25/00
[52] U.S. Cl. ........................................... 123/694; 123/695
[58] Field of Search .................................... 123/672, 694, 123/695

[56] References Cited

U.S. PATENT DOCUMENTS

| | | | |
|---|---|---|---|
| 4,475,512 | 10/1984 | Suzuki et al. | 123/694 |
| 4,821,701 | 4/1989 | Nankee, II et al. | |
| 4,825,837 | 5/1989 | Nakagawa | 123/489 |
| 5,119,671 | 6/1992 | Kopera. | |
| 5,211,147 | 5/1993 | Ward | 123/418 |
| 5,335,637 | 8/1994 | Davis et al. | |
| 5,360,528 | 11/1994 | Oh et al. | 204/425 |
| 5,400,762 | 3/1995 | Fodale et al. | |
| 5,755,094 | 5/1998 | Maki et al. | 123/673 |
| 5,758,490 | 6/1998 | Maki et al. | 123/674 |

*Primary Examiner*—John Kwon
*Attorney, Agent, or Firm*—Mark P. Calcaterra

[57] ABSTRACT

A method for utilizing a wide range oxygen sensor voltage output that is proportional to exhaust gas fuel air mixture to correct for variations in a flexible fueled vehicle's fuel alcohol content is provided for a vehicle not equipped with an alcohol sensor.

3 Claims, 3 Drawing Sheets

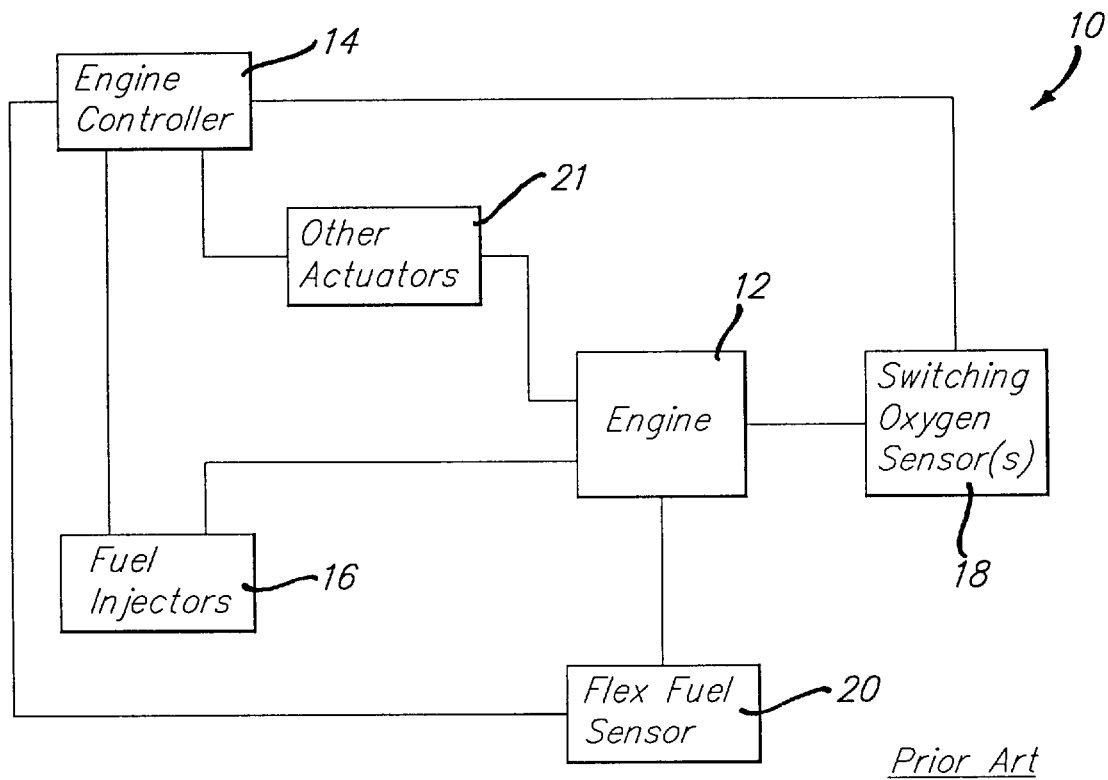
_Prior Art_
FIG. 1a.

CONTROL OF A MULTI (FLEXIBLE) FUELED VEHICLE UTILIZING WIDE RANGE OXYGEN SENSOR FEEDBACK

BACKGROUND OF THE INVENTION

1. Technical Field

The present invention relates generally to fuel compositions for a motor vehicle, and more particularly to a method for determining the percent alcohol content of fuel used in a motor vehicle capable of burning more than one type of fuel in its internal combustion engine or other power plant.

2. Discussion

Stoichiometric is defined as the chemically correct proportion of fuel and oxygen for the conversion of all of the fuel available for combustion into oxidized products. The value of the stoichiometric fuel to air ratio level depends on the fuel's composition. Basic gasoline fuels comprise hydrocarbons in varying degrees with the accepted value of stoichiometric fuel to air ratio for gasoline being 0.0688:1. When the fuel contains oxygen, such as those with alcohols, the oxygen accompanying the hydrocarbon-based fuel must be compensated for in the fuel management system or a lean-of-stoichiometric combustion will be encountered.

An increase in fuel delivery rates, indicated by an increase of fuel injector pulse width, is required to maintain the desired fuel to air ratios with alcohol or alcohol-gasoline fuel mixtures. Currently M85 fuel, which is 85% methanol and 15% gasoline, and E85 fuel, which is 85% ethanol and 15% gasoline, are in use or are being considered for use in passenger vehicles. The approximate fuel delivery rate increase required for M85 and E85 are +93% and +49% respectively when compared to a gasoline-based system. Dedicated M85 or E85 vehicles have been proposed as well as "Flexible Fuel Vehicles" (FFVs) that will operate on any mixture of gasoline and 0%–85% alcohol. This varied fuel composition needs to be sensed and reflected when selecting the fuel delivery rate.

Sensing the percent alcohol in the fuel has been accomplished with a methanol concentration FFV sensor described in U.S. Pat. No. 5,119,671, which is hereby expressly incorporated by reference in its entirety. However, introduction of ethanol fuel into such a system based upon M85 may not provide an accurate assessment of the alcohol content of the fuel. An FFV sensor utilizes the dielectric properties of the fuel to determine fuel composition. This property is unique for gasoline, methanol and ethanol. As this effect is a function of various alcohols, and the alcohol's temperature, the output of an FFV sensor may be affected. Therefore, introduction of ethanol/gasoline fuel mixtures into a system calibrated for methanol/gasoline mixtures may corrupt the accurate assessment of alcohol content.

Furthermore, a methanol blend with gasoline will carry water in a thoroughly mixed solution rather than as a separated liquid as is the case with water and gasoline. The dielectric property of water is very close to that of methanol and may affect the output of an FFV sensor. It is thus possible that the control system could sense M85 while the actual fuel composition could be a mixture of 75% methanol, 15% gasoline and 10% water. Therefore, pure dielectric sensing cannot be regarded as 100% accurate.

Even with the alcohol content known, the use of exhaust gas feedback information may be a more precise method to maintain stoichiometric fuel to air ratios. A system to determine alcohol percent utilizing a standard oxygen sensor, which only gives a rich or lean fuel to air a ratio signal, has been developed and is described in U.S. Pat. No. 5,400,762, "Method for Determining Fuel Composition" which in its entirety is hereby expressly incorporated by reference. This method checks boundary conditions of the short term oxygen sensor feedback signal and adjusts the percent alcohol content stored in the engine controller unit memory without the use of an FFV sensor or ethanol sensor. Other related inventions are described in U.S. Pat. No. 5,335,637, "Energy Adjust for a Flexible Fuel Compensation System," and U.S. Pat. No. 4,821,701, "Purge Corruption Detection", each in its entirety is hereby expressly incorporated by reference.

SUMMARY OF THE INVENTION

A system equipped without an FFV sensor, and with only a switching oxygen sensor, indicates only a rich or lean exhaust gas fuel to air mixture, without identifying the magnitude of the error. The oxygen sensor feedback term must increment or ramp until a switch in the oxygen sensor state is obtained, indicating that a stoichiometric condition has been reached. A varying amount of time is required, due to this ramping, to adjust the fuel rate to the appropriate level, particularly with an abrupt change in the fuel's percent alcohol content. During this time the engine could be operating in a range that is significantly rich or lean of stoichiometric. Both conditions are unwanted. Additionally, significantly lean operation accompanied by high engine load could cause improper engine operation.

Therefore, it is an object of the subject invention to utilize a commercially available wide range oxygen sensor to present output signals proportional to the exhaust gas/fuel air ratio level rather that just a rich/lean signal from a switching sensor in a flexible fuel control system.

It is another object of the subject invention to use the output from a wide range oxygen sensor and a control system using an algorithm such as a Proportional/Integral/Derivative (PID) feedback algorithm to process an error signal in the fuel to air ratio and immediately correct the fuel delivery rate to provide the correct ratio and then to adjust the percent alcohol content proportional to an adjustment in the fueling rate.

Additionally, with an engine at normal operating temperature and during normally rich of stoichiometric "open loop" operation, such as during wide open throttle (WOT), the output of a simple switching oxygen sensor that operates only at or near stoichiometric cannot be utilized. It is therefore a further object of the subject invention to utilize a voltage signal proportional to the fuel air ratio of a wide range oxygen sensor to monitor and enable the adjustment of the fuel to air ratio to a desired value as well as to adjust the percent alcohol content during this condition.

Finally, it is an object of the subject invention to provide a control method that is insensitive to the type of alcohol (methanol or ethanol) or fuel to air ratio control.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIG. 1a is a block diagram showing the elements of an engine system of the prior art;

FIG. 2 is a flow chart illustrating wide range oxygen feedback control methodology during open loop control.

DETAILED DESCRIPTION OF THE PREFERRED EMBODIMENTS

Figure 1B:
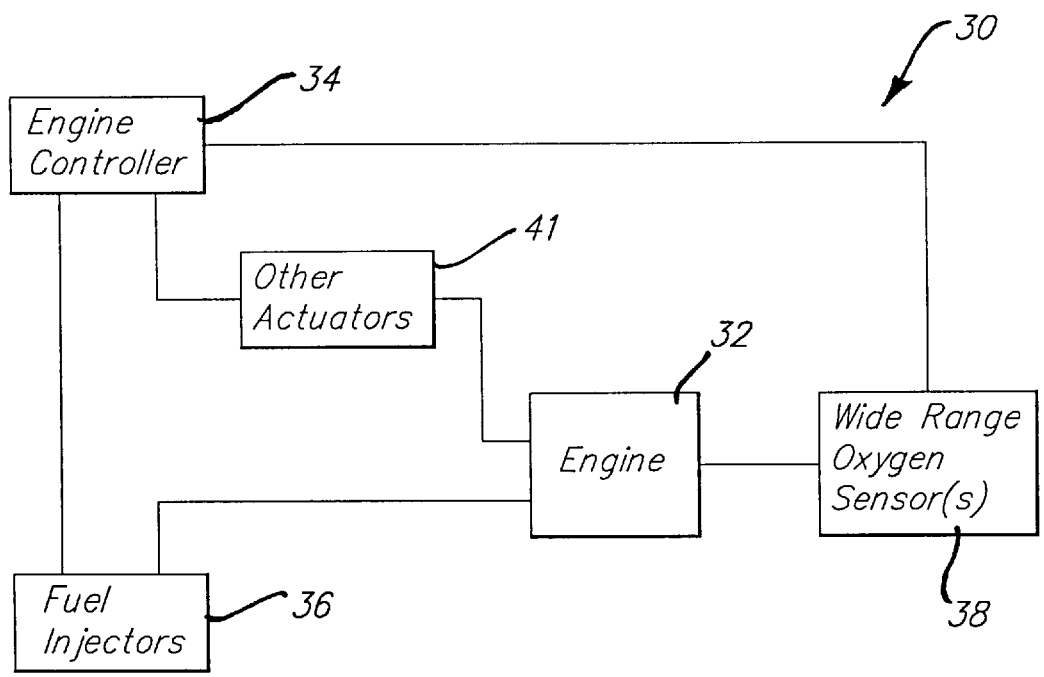
FIG. 1b is a block diagram showing the elements of an engine system illustrating the elements that can be controlled with the methodology of the subject invention.

Referring to FIG. 1a, a prior art engine system 10 is shown that utilizes an engine controller 14 to interact with the engine 12, other actuators 21, if necessary, fuel injectors 16 or other fuel delivery means, a flex fuel sensor or component 20 and sensor(s) 18 such as a switching oxygen sensor. In this system 10, the flex fuel sensor 20 uses the dielectric properties of the fuel to sense the methanol or ethanol concentration therein. Flex fuel sensor 20 presents an output to the engine controller 14 that represents the alcohol concentration. Engine controller 14 then uses the signal from sensor 20 to adjust actuators 21 and fuel injectors 16, if necessary, to keep the combusable fuel mixture at the stoichiometric condition. The system 10 utilizes a conventional switching oxygen sensor 18 to further provide a signal to the engine controller 14 representing the rich or lean condition of the fuel to air ratio. Adjustments are made accordingly by engine controller 14.

Referring now to FIG. 1b, an engine system 30 is shown that utilizes an engine controller 34 to interact with the engine 32, other actuators 41, if necessary, fuel injectors 36 or other fuel delivery means, and sensor(s) 38 such as a wide range oxygen sensor. In this FIG. 1b, the elements controlled by the methodology of the subject invention are shown. Note that the flex fuel sensor 20 and the switching oxygen sensor(s) 18 shown in FIG. 1a are eliminated. In this system 30, the wide range oxygen sensor 38 continuously provides information regarding the instantaneous value of the fuel to air ratio to the engine controller 34 thereby allowing the engine controller 34 to utilize the information not only to prepare and present the combustible mixture to the engine 32 that will result in a stoichiometric condition, but also to identify and account for the methanol or ethanol concentration of the fuel when preparing and presenting the combustible mixture.

Figure 1C:
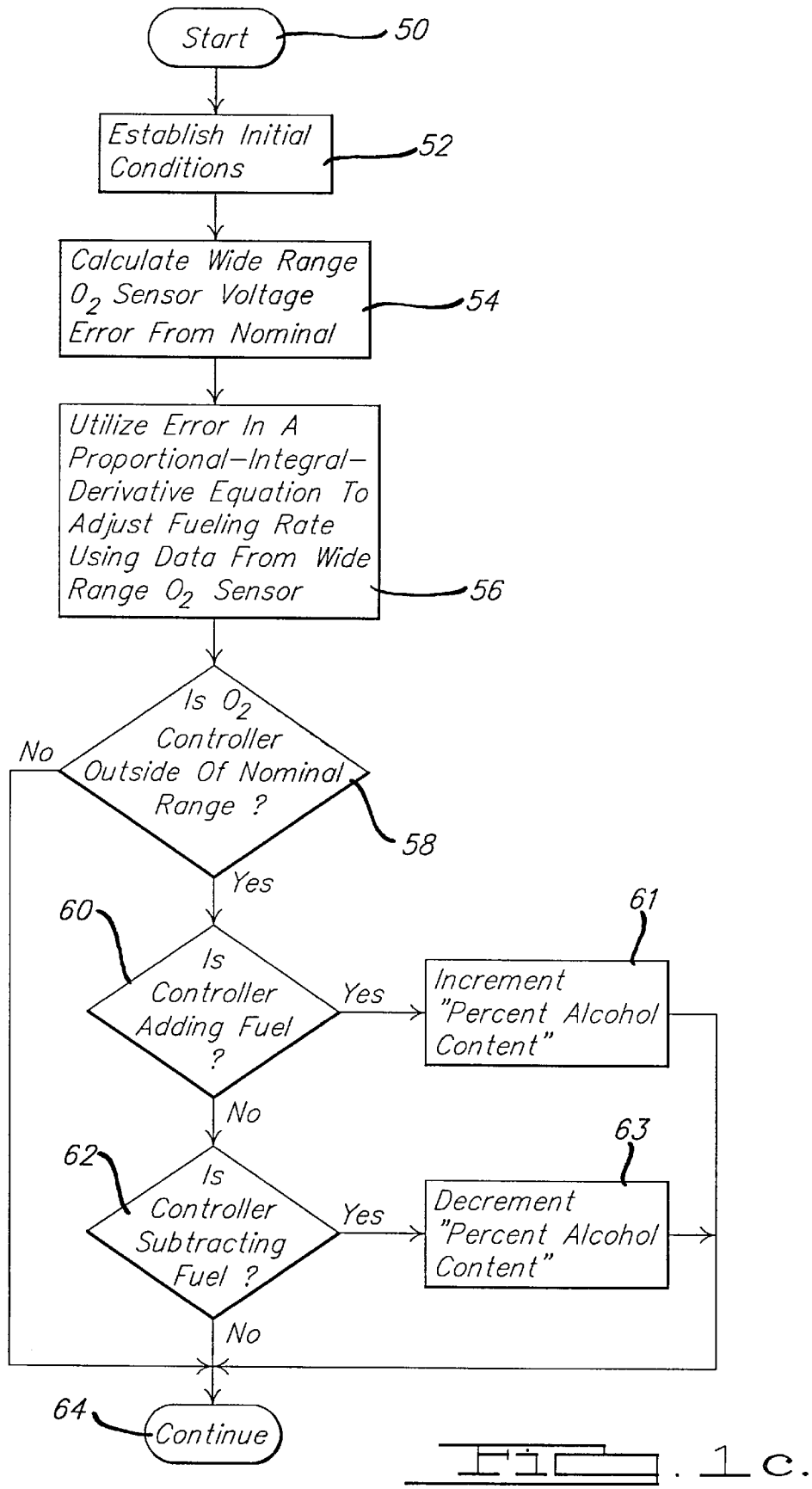
FIG. 1c is a flow chart illustrating wide range oxygen feedback control methodology during closed loop stoichiometric control.
Figure 3:
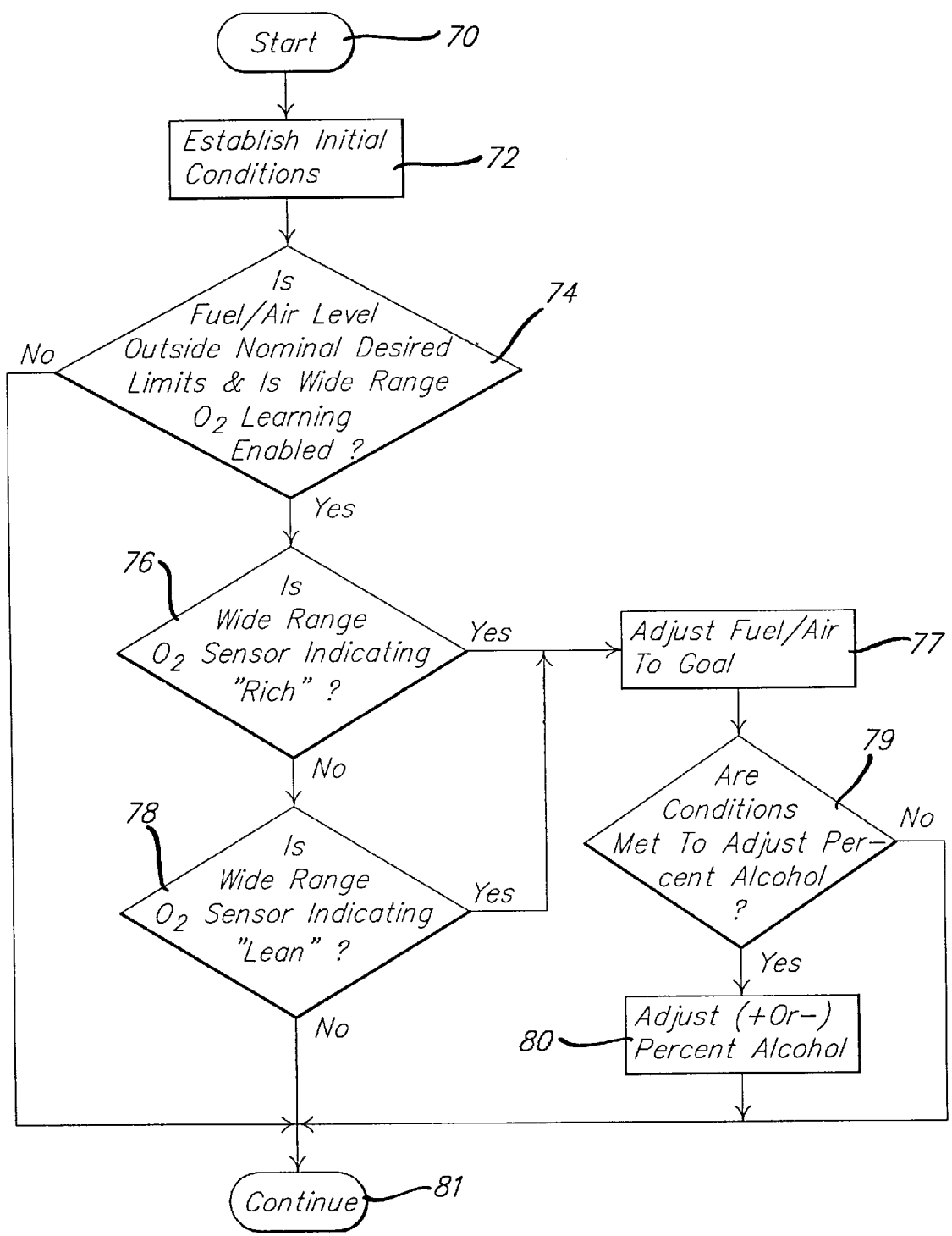

Referring now also to FIG. 1c, a method is shown for maintaining stoichiometry of the ratio in an internal combustion flexible fuel engine 32. The method comprises sensing exhaust gas fuel-to-air ratio level using a wide range oxygen sensor, diagrammatically shown as 18, to directly determine a current fuel-to-air ratio level from a proportional output signal of the sensor, and altering a fuel delivery rate to bring the current sensed level to substantial stoichiometry. In other words, what is shown is an internal combustion engine capable of operating with fuel comprising a mixture of gasoline and alcohol, a method of maintaining a substantially stoichiometric fuel-to-air ratio comprising the steps of sensing exhaust gas fuel-to-air ratio level using a wide range oxygen sensor generating an output signal proportional to the level; determining an error difference between a sensed exhaust gas fuel-to-air ratio level from a desired level; and processing the error difference to correct a fuel delivery rate, if necessary, to attain the desired level. Another way of describing this is to picture an internal combustion engine capable of operating with a fuel mixture of gasoline and alcohol and utilizing an engine controller for generating fuel delivery at a variable rate proportional to a percent alcohol level in the fuel, a method of maintaining substantial stoichiometric fuel-to-air ratio comprising the steps of sensing exhaust gas fuel-to-air ratio level using a wide range oxygen sensor generating an output signal proportional to the level; determining an error difference between the sensed exhaust gas fuel-to-air ratio level from a substantially stoichiometric level; processing the error difference to correct a fuel delivery rate, if necessary, to attain the stoichiometric level; and adjusting an indication maintained in the engine controller of percent alcohol level in the fuel in accordance with any correction effected in the fuel delivery rate.

The method starts in block 50 and moves to block 52 to establish initial conditions that may be prerequisites for engine control and to record nominal values that will be used in other parts of the method. Next, in block 54, the method calls for the calculation of a voltage error. This is the difference between the output of the wide range oxygen sensor 38 and the nominal values defined via the engine control-calibration. Next, in block 56, the methodology calls for the utilization of the error in a proportional-integral-derivative equation to adjust the fueling rate utilizing the voltage error from block 54 via adjustments of the short term fuel feedback multiplier ($O_2$ Controller).

Next, in decision block 58, the engine controller 34 polls the short term fuel correction feedback ($O_2$ Controller) to see if the value is outside of the nominal range. If it is not, the method falls through to block 64 to continue other steps in the engine control process. If the value of the $O_2$ Controller is outside of the nominal range, in block 60, the engine controller 34 checks to see if conditions call for added fuel to "enrichen" the fuel to air mixture beyond nominal limits. If added fuel is demanded, the engine controller 34 increments the percent alcohol content variable in block 61 and then falls through to block 64 to continue with other engine controller steps. If fuel is not demanded, the engine controller 34 checks to see if conditions call for fuel to be subtracted from the mixture beyond nominal limits in block 62. If not, the controller 34 falls through to block 64. If so, engine controller 34 decrements the variable "percent alcohol content" in block 63 and then falls through to block 64 to continue other engine control steps.

FIG. 2 is a flow chart illustrating a methodology for utilization of a wide range oxygen feedback sensor in conditions where the engine is operating at normal operating temperatures and the percent alcohol can be adjusted during a rich of stoichiometric open loop condition such as those experienced in "wide open throttle."

Here the method starts in block 70 and moves to block 72 to establish initial conditions and record nominal values that will be used in other parts of the method. Next, in block 74, the controller 34 checks to see if the fuel mixture is outside of the nominal values (defined via the engine controller calibration as indicated by the value of the output of the wide range oxygen sensor 38). Also, in this block 74, the engine controller 34 checks to make sure that any learning features connected with the wide range oxygen sensor 38 are enabled. If not, the method falls through to block 81 to continue other engine control steps. If so, in block 76, the engine controller 34 checks to see if the signal from the wide range oxygen sensor 38 is at a level that would indicate that the fuel to air ratio is too rich (this is a relative level that is defined in the initial conditions and nominal values). If so, the engine controller 34 moves on to the step in block 77 to adjust the fuel to air ratio closer to the goal as defined in the initial conditions and nominal values. After adjusting the fuel to air ratio, the engine controller 34 checks to see if conditions are met to adjust the percent alcohol variable from those represented in the initial conditions and nominal values. If so, the percent alcohol variable is adjusted up or down accordingly in block 80 before the engine controller 34 continues other engine control steps in block 81.

Returning to block 76, if the output of the wide range oxygen sensor 38 is not at a level that would indicate that the fuel to air mixture is too rich, the engine controller 34 checks to see if the wide range oxygen sensor signal indicates that the fuel to air mixture is lean when compared to values represented by the initial conditions and nominal values in block 78. If not, the engine controller 34 continues other engine control steps in block 81. If so, the engine controller 34 adjusts the fuel to air ratio in block 77 and alcohol percent in blocks 79 and 80 as described above.

It is to be noted that the methodology shown in FIG. 2 to handle open loop conditions such as those represented in a wide open throttle condition of engine operation, cannot be accomplished with a switching type oxygen sensor 18 as illustrated in FIG. 1.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. In a method for maintaining stoichiometry of fuel-to-air ratio in an internal combustion flexible fuel engine, the improvement comprising:

sensing an exhaust gas fuel-to-air ratio level using a wide range oxygen sensor;

comparing said exhaust gas fuel-to-air ratio level to a desired fuel-to-air ratio value to determine an error value;

using said error value in a proportional-integral-derivative calculation to determine a fueling adjustment value;

altering a fuel delivery rate to said engine according to said fueling adjustment value to bring said exhaust gas fuel-to-air ratio level to substantial stoichiometry;

incrementing a percent alcohol content value used to set said desired fuel-to-air ratio value if said exhaust gas fuel-to-air ratio level is outside of a desired range and said step of altering said fuel delivery rate to said engine is adding fuel; and decrementing said percent alcohol content value used to set said desired fuel-to-air ratio value if said exhaust gas fuel-to-air ratio level is outside of said desired range and said step of altering said fuel delivery rate to said engine is subtracting fuel.

2. In an internal combustion engine capable of operating with fuel comprising a mixture of gasoline and alcohol, a method of maintaining a desired fuel-to-air ratio comprising the steps of:

sensing an exhaust gas fuel-to-air ratio level using a wide range oxygen sensors generating an output signal proportional to the exhaust gas fuel-to-air ratio level;

determining an error difference between said exhaust gas fuel-to-air ratio level from a desired level;

processing the error difference in a proportional-integral-derivative calculation to correct a fuel delivery rate to attain the desired level;

incrementing a percent alcohol content value used to set said desired level if said exhaust gas fuel-to-air ratio level is outside of a desired range and said step of correcting said fuel delivery rate is adding fuel; and decrementing said percent alcohol content value used to set said desired level if said exhaust gas fuel-to-air ratio level is outside of said desired range and said step of correcting said fuel delivery rate is subtracting fuel.

3. In an internal combustion engine capable of operating with fuel comprising a mixture of gasoline and alcohol and utilizing an engine controller for generating fuel delivery at a variable rate proportional to a percent alcohol level in the fuel, a method of maintaining substantial stoichiometric fuel-to-air ratio comprising the steps of:

sensing an exhaust gas fuel-to-air ratio level using a wide range oxygen sensor;

generating an output signal proportional to the exhaust gas fuel-to-air ratio level;

determining an error difference between the exhaust gas fuel-to-air ratio level and a desired fuel-to-air ratio level;

processing the error difference to correct a fuel delivery rate to attain a stoichiometric level;

determining if the error difference is outside of a desired range;

determining if the error difference is indicating one of a rich and lean condition if it is outside of the desired range;

adjusting said desired fuel-to-air ratio level if the error difference is indicating one of said rich and lean conditions and is outside of the desired range;

incrementing a percent alcohol content value used to set said desired fuel-to-air ratio level if said exhaust gas fuel-to-air ratio level is outside of said desired range and said step of correcting said fuel delivery rate is adding fuel; and decrementing said percent alcohol content value used to set said desired fuel-to-air ratio level if said exhaust gas fuel-to-air ratio level is outside of said desired range and said step of correcting said fuel delivery rate is subtracting fuel.

* * * * *